US012566030B2

(12) United States Patent
Hung

(10) Patent No.: US 12,566,030 B2
(45) Date of Patent: Mar. 3, 2026

(54) QUICK-RELEASE AIR KNIFE OF PACKAGE THERMAL-SHRINKING OVEN

(71) Applicant: Tzu-Chin Hung, Taipei (TW)

(72) Inventor: Tzu-Chin Hung, Taipei (TW)

(*) Notice: Subject to any disclaimer, the term of this patent is extended or adjusted under 35 U.S.C. 154(b) by 375 days.

(21) Appl. No.: 18/455,873

(22) Filed: Aug. 25, 2023

(65) Prior Publication Data

US 2024/0361077 A1 Oct. 31, 2024

(30) Foreign Application Priority Data

Apr. 25, 2023 (TW) ................................ 112203924

(51) Int. Cl.
*B65B 53/06* (2006.01)
*F27D 7/02* (2006.01)

(52) U.S. Cl.
CPC ................ *F27D 7/02* (2013.01); *B65B 53/06* (2013.01)

(58) Field of Classification Search
CPC ....... F27D 7/02; B65B 53/06; B65B 2220/06; B65B 2210/14; B65B 61/005; B65B 61/06; B05B 15/65
See application file for complete search history.

(56) References Cited

U.S. PATENT DOCUMENTS 7,849,770 B2 * 12/2010 Floding .............. B65H 35/0006 83/402
9,551,529 B2 * 1/2017 Freers ..................... B05C 11/02
10,130,972 B2 * 11/2018 Pahl ........................ B05C 5/027
(Continued)

FOREIGN PATENT DOCUMENTS

JP H10193443 A * 7/1998 ............. B29C 48/08
KR 20130100453 A * 9/2013 ............... B65C 9/24
(Continued)

*Primary Examiner* — Gregory A Wilson
(74) *Attorney, Agent, or Firm* — Rosenberg, Klein & Lee

(57) ABSTRACT

A quick-release air knife of a package thermal-shrinking oven includes at least one fixing ring, at least one pair of fixing elements, a plurality of air knife tubes, and air knife blades. The fixing ring is at least formed, in an interior thereof, with a through hole and at least one pair of notches and fixing holes are formed in a periphery of the through hole. The fixing elements respectively extend through the fixing holes to connect to a bottom portion of a hot airflow combination box arranged on a top portion of a package thermal-shrinking oven. A top portion of each of the air knife tubes is provided with a connecting portion and at least one pair of fitting blocks. The fitting blocks of the air knife tube match with the notches of the fixing ring, and a top end of the air knife tube is pushed upwards to pass through the through hole and the notches and then rotated by an angle to have the fitting blocks fit to a top surface of the fixing ring and the connecting portion of the air knife tube connected to the bottom portion of the hot airflow combination box for introducing a hot airflow into the air knife tube. The air knife blades are combined to the exteriors of the air knife tubes to guide a path of discharging the hot airflow out of the air knife tubes. Thus, a quick-release air knife structure that is operable through clockwise or counterclockwise direction to have the air knife tube to connect to or disconnect from the bottom portion of the hot airflow combination box.

13 Claims, 8 Drawing Sheets

(56) References Cited

U.S. PATENT DOCUMENTS

| | | | | |
|---|---|---|---|---|
| 2003/0061725 A1* | 4/2003 | Riley | .................... | F26B 21/004<br>34/236 |
| 2015/0028138 A1* | 1/2015 | Dubois | ................. | F26B 21/004<br>239/597 |

FOREIGN PATENT DOCUMENTS

| | | |
|---|---|---|
| TW | M494749 U | 2/2015 |
| TW | M564557 U | 8/2018 |

* cited by examiner

QUICK-RELEASE AIR KNIFE OF PACKAGE THERMAL-SHRINKING OVEN

BACKGROUND OF THE INVENTION

1. Field of the Invention

The present invention relates to a quick-release air knife of a package thermal-shrinking oven, and in particular to a quick-release air knife structure that is applicable to heat-shrinking packaging of a heat-shrinking packaged object and allows an air knife tube to connect to or disconnect from the package thermal-shrinking oven through rotation to fit or disengage between a fixing ring and fitting blocks of the air knife tube.

2. The Related Arts

Package thermal-shrinking ovens have been widely used in packaging applications for various packaged objects, particularly for various heat-shrinkable film sealed packaged objects that may have different outside contours and shapes, such as meal boxes, noodles, medicinal cuisines, salads, compact disc (CD) boxes, gifts, and so on. Thus, it is often to arrange a plurality of air knives in a known package thermal-shrinking oven and the air knives supply hot airflows to carry out a heat-shrinking packaging operation on an object-to-be-sealed passing through the package thermal-shrinking oven. The air knives that are arranged in the interior of the known package thermal-shrinking oven are fixedly connected to the package thermal-shrinking oven. In case that the air knives fail and break down, or a specific service time or the lifespan has been reached so as to require servicing or replacing, it would be hard for the air knives to be serviced or replaced. An easy solution for such a problem is to replace the entire package thermal-shrinking oven, or to replace a hot airflow output box to which the air knives are connected, and this, in addition to the difficulty of servicing and replacing the air knives, increases additional, but perhaps unnecessary, cost for maintaining and replacing such facility. This is a problem to be handled for air knife servicing and replacing operations of the known package thermal-shrinking oven.

Further, in another known package thermal-shrinking oven, the air knives are fastened by means of bolt fastening to a top portion or a bottom structure of the package thermal-shrinking oven to thereby fixedly combine the air knives with the package thermal-shrinking oven. The structure and technique of such a known way of bolt-fastening the air knives to the top portion or the bottom portion of the package thermal-shrinking oven requires a significant structure modification for an upper end or a lower end of an air knife, or a sophisticated bolt-fastening seat structure must be designed. This heightens the fabrication cost of the air knife. Further, mounting and dismounting of the air knife must be performed with tools, and this leads to the mounting and dismounting of the air knife even more complicated. Consequently, mounting and dismounting of the air knife requires increased human labor and working hours, and it is impossible to efficiently and conveniently mount and dismount an air knife assembly, leading to increased inconvenience and difficulty for mounting and dismounting the air knife, and damaging the industrial utilization and economic value thereof.

Prior art patent documents are known, such as Taiwan Utility Model M494749, which provides an airflow guide structure of a heat-baking shrinking oven, in which a typical known air knife structure and technique of a package thermal-shrinking oven are disclosed. In the document, a modified structure of an airflow guide funnel (321) must be arranged on a top portion of an airflow guide pillar (32) corresponding to an air knife. The airflow guide funnel (321) has a periphery in which bolt holes (shown in the drawings, but not labeled) are formed, so that bolts may be applied to fastened upward to an airflow guide structure (3) of a hot airflow box. However, for servicing, maintaining, or replacing of the airflow guide pillar (32), there are still the same problems and drawbacks as the above-described prior art that the structure of an upper end or a lower end of an air knife has to be significantly modified, or a sophisticated bolt-fastening seat structure must be designed. This heightens the fabrication cost of the air knife to thereby increase the fabrication cost of the air knife, and further, mounting and dismounting of the air knife must be performed with tools so as to make mounting and dismounting of the air knife even more complicated, leading to increase of human labor and working hours for mounting and dismounting the air knife and impossibility of efficiently and conveniently mounting and dismounting the air knife assembly to eventually increase the inconvenience and difficulty for mounting and dismounting the air knife.

In addition, Taiwan Utility Model M564557, which provides a cyclone baking oven, in which another typical known air knife structure and technique of a package thermal-shrinking oven are disclosed, wherein in the document, a positioning seat (35) is provided on a bottom portion of an airflow dispenser (33) corresponding to an air knife structure. The positioning seat (35) is provided with a plurality of elongated arc holes (351) and aligning portions (352). A plurality of fixing seats (34) are provided on an adjusting board (15) of an airflow dispensing tube (311) of an electrical host airflow device (31) connected to a bottom portion of an oven body (1) of the cyclone baking oven. The fixing seats (34) are each provided with a plurality of fixing holes (341) and aligning portions (342). A plurality of positioning bolts (352) penetrate through the elongated arc holes (352) and fasten to the fixing holes (341) to fix the airflow dispenser (33). The structure for fixing the airflow dispenser (33) is complicated and thus the equipment cost is increased, and further, the mounting operation of the airflow dispenser (33) takes an increased amount of human labor and working hours, and requires, if necessary, specific technicians and tools. For example, adjusting must be carried out for position corresponding between the aligning portions (342) of the fixing seats (34) and the aligning portions (352) of the positioning seats (35) of the airflow dispenser (33) to allow for application of the positioning bolts (352). Thus, there are still the same problems and drawbacks as the above-described prior art that mounting and dismounting of an air knife of a package thermal-shrinking oven must be performed with tools so as to make mounting and dismounting of the air knife even more complicated, leading to increase of human labor and working hours for mounting and dismounting the air knife and impossibility of efficiently and conveniently mounting and dismounting the air knife assembly to eventually increase the inconvenience and difficulty for mounting and dismounting the air knife.

SUMMARY OF THE INVENTION

For the quick-release air knife structure adopted in the previously discussed known package thermal-shrinking oven or the above-mentioned documents, to mount air knife to a package thermal-shrinking oven or to dismount from the package thermal-shrinking oven, it is necessary to make a significant structure modification for an upper end or a lower end of the air knife, or a sophisticated bolt-fastening seat structure must be designed, so that the fabrication cost of the air knife is even increased, and mounting and dismounting of the air knife must be performed with tools so as to make mounting and dismounting of the air knife even more complicated, leading to increase of human labor and working hours for mounting and dismounting the air knife and impossibility of efficiently and conveniently mounting and dismounting the air knife assembly to eventually increase the inconvenience and difficulty for mounting and dismounting the air knife, creating problems and drawbacks in respect of deterioration of the industrial utilization and economic value thereof.

Thus, the present invention provides a quick-release air knife of a package thermal-shrinking oven, which comprises:

at least one fixing ring, the fixing ring being formed, in an interior thereof, with at least through hole, a periphery of the through hole being formed with at least one pair of notches and fixing holes, the notches being in communication with the through hole;

at least one pair of fixing elements, which have upper ends combined with and fixed to a bottom portion of a hot airflow combination box arranged on a top portion of a package thermal-shrinking oven and lower ends correspondingly extending into the fixing holes of the fixing ring and connected to and fixed to the fixing holes;

a plurality of air knife tubes, each of the air knife tubes having a top portion that is formed with a connecting portion and at least one pair of fitting blocks, wherein the connecting portion and the fitting blocks of the air knife tube respectively correspond to ad match with the through hole and the notches of the fixing ring, and the top portion of the air knife tubes is upward movable to pass through the through hole and the notches and then rotated by an angle to have the fitting blocks fit to a top surface of the fixing ring and to have the connecting portion of the air knife tube connected to the bottom portion of the hot airflow combination box for introducing a hot airflow into the air knife tube; and a plurality of air knife blades, each of the air knife blades being combined to outside of the air knife tube, the air knife blade guiding a discharging direction and path of the hot airflow discharged from the air knife tube.

Further, in the above quick-release air knife of the package thermal-shrinking oven according to the present invention, the top surface of the fixing ring is formed with at least one pair of retention engagement troughs, and the retention engagement troughs are respectively in communication with top ends of the notches of the fixing ring for retention engagement and positioning for the fitting blocks of the air knife tube.

In the above the quick-release air knife of the package thermal-shrinking oven according to the present invention, each of the fixing elements comprises at least one upper fixing member and one lower fixing member, wherein the upper fixing member has a top portion that is provided with a threaded rod for fastening to the bottom portion of the hot airflow combination box arranged on the top portion of the package thermal-shrinking oven, and the upper fixing member is formed, in an interior of a lower end, with at least one threaded hole, the lower end of the upper fixing member extending through the fixing holes of the fixing ring, and the lower fixing member has a top surface that is provided with a threaded rod to correspondingly fasten to the threaded hole in the lower end of the upper fixing member to fix the fixing ring between the upper fixing member and the lower fixing member.

In the above the quick-release air knife of the package thermal-shrinking oven according to the present invention, the bottom portion of the hot airflow combination box arranged on the top portion of the package thermal-shrinking oven to which the top portion of the upper fixing member of each of the fixing elements is fastened is formed with a plurality of fastening threaded holes to each receive the threaded rod of the top portion of the upper fixing member of each of the fixing elements to fasten thereto.

In the above the quick-release air knife of the package thermal-shrinking oven according to the present invention, the lower fixing member of each of the fixing elements has a lower-end diameter that is greater than a diameter of the fixing holes of the fixing ring to have the threaded rod of the top surface of the lower fixing member fastened to the threaded hole of the lower end of the upper fixing member, such that the lower end of the lower fixing member engages with and is retained under the fixing hole of the fixing ring.

In the above the quick-release air knife of the package thermal-shrinking oven according to the present invention, at least one heat-resistant ring is fit outside the connecting portion on the top portion of the air knife tube to correspondingly connect to the bottom portion of the hot airflow combination box.

In the above the quick-release air knife of the package thermal-shrinking oven according to the present invention, the bottom portion of the hot airflow combination box to which the connecting portion on the top portion of the air knife tube is connected is formed with a plurality of airflow exit openings, the airflow exit openings respectively corresponding to the through holes of each of the fixing ring to respectively correspond to and connect with the connecting portion on the top portion of each of the air knife tubes.

In the above the quick-release air knife of the package thermal-shrinking oven according to the present invention, the air knife tubes are connected to the bottom portion of the hot airflow combination box arranged on the top portion of the package thermal-shrinking oven and are arranged in two rows in the interior of the package thermal-shrinking oven having arrangement shapes respectively corresponding to two 180-degree segments at two sides in the interior of the package thermal-shrinking oven.

In the above the quick-release air knife of the package thermal-shrinking oven according to the present invention, each of the air knife tubes is formed with a plurality of fastening threaded holes, and each of the air knife blades is formed with a plurality of fastening elongated holes to respectively correspond to the fastening threaded holes of the air knife tube and to each fasten by means a fastening bolt to have the air knife blade combined with and fixed to outside of the air knife tube.

In the above the quick-release air knife of the package thermal-shrinking oven according to the present invention, the air knife tubes are each formed with a plurality of hot airflow discharging openings to each discharge a hot airflow, and the air knife blades are each formed with a plurality of airflow-discharging elongated holes to blow out and guide blowing direction and path of the hot airflow discharged from each of the hot airflow discharging openings of the air knife tube.

In the above the quick-release air knife of the package thermal-shrinking oven according to the present invention, each of the air knife blades is combined, at an exterior thereof, with at least one elastic airflow blocking board to block the hot airflow from discharging from the air knife blades.

In the above the quick-release air knife of the package thermal-shrinking oven according to the present invention, the elastic airflow blocking board is provided with at least one elastic engagement portion on each of two sides to be set in retaining engagement with two sides of the exterior of the air knife blade by means of compressibility and restoration spring force of the elastic engagement portion, so that the elastic airflow blocking board is combined with and fixed to the exterior of the air knife blade.

In the above the quick-release air knife of the package thermal-shrinking oven according to the present invention, the air knife blades and the elastic airflow blocking board have a cross-section having a V-shape.

The efficacy of the quick-release air knife of the package thermal-shrinking oven according to the present invention is that the fixing ring, the fixing elements, the air knife tube, and the air knife blade jointly form a quick release structure of the air knife tube, and particularly, the fitting blocks of the air knife tube match with the notches of the through hole of the fixing ring to allow the top portion of the air knife tube to be pushed upward to pass through the through hole and the notches to be then rotated by an angle to have the fitting blocks fit to the top surface of the fixing ring, so as to have the connecting portion of the air knife tubes quickly connect to the bottom portion of the hot airflow combination box, thereby allowing the air knife tube to be quickly combined with and fixed to the bottom portion of the hot airflow combination box, or to have the air knife tube rotated in a reversed direction by an angle to have the air knife tube quickly removed from the bottom portion of the hot airflow combination box, and there is no need to significantly modify the structure of the bottom portion of the hot airflow combination box, and there is no need for applying any tool for such an operation, making it easy, convenient, saving time and structure cost, and further, at least one elastic airflow blocking board is set in elastic retaining engagement with and combined with the air knife tube to block the hot airflow from discharging from the air knife blade, allowing each air knife tube combined with the bottom portion of the hot airflow combination box to adjust, according to different packaged object and the heat-shrinking packaging need for the packaging film thereof, for controlling discharging or not for the hot airflow of the air knife tubes, thereby controlling the quality of the heat-shrinkable package film thermally shrunk and packaging on the packaged object to be best. In other words, the quick-release air knife of the package thermal-shrinking oven according to the present invention, in addition to improving the speed and efficiency of mounting or dismounting the air knife tube, may control, according to the shape and size of different packaged object and heat-shrinking packaging property and heat-shrinking packaging requirement for the heat-shrinkable package film, to have the best quality of heat-shrinking packaging by which the industrial utilization and economic value of the present invention can be enhanced.

DETAILED DESCRIPTION OF THE PREFERRED EMBODIMENTS

Figure 1:
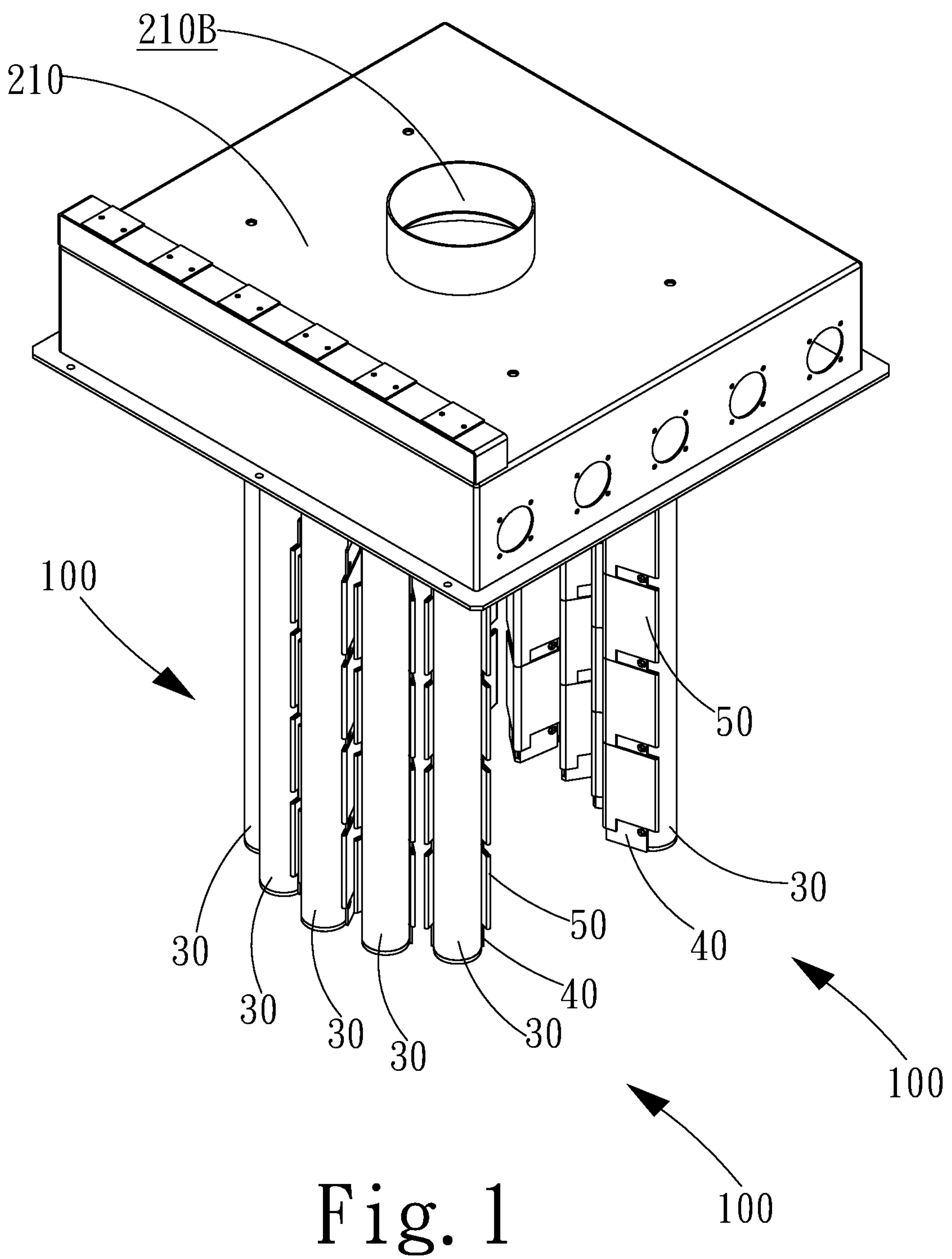
FIG. 1 is a perspective view showing a quick-release air knife of a package thermal-shrinking oven according to the present invention.

Referring firstly to FIGS. 1, 2, 3, 4, 5, and 6, the present invention provides a quick-release air knife 100 of a package thermal-shrinking oven, which comprises at least one fixing ring 10. The fixing ring 10 is at least formed, in an interior thereof, with a through hole 11, and a periphery of the through hole 11 is formed with at least one pair of notches 111 and fixing holes 112. The notches 111 are in communication with the through hole 11. A top surface of the fixing ring 10 is formed with at least one pair of retention engagement troughs 12, and the retention engagement troughs 12 are respectively in communication with top ends of the notches 111 of the fixing ring 10.

Figure 2:
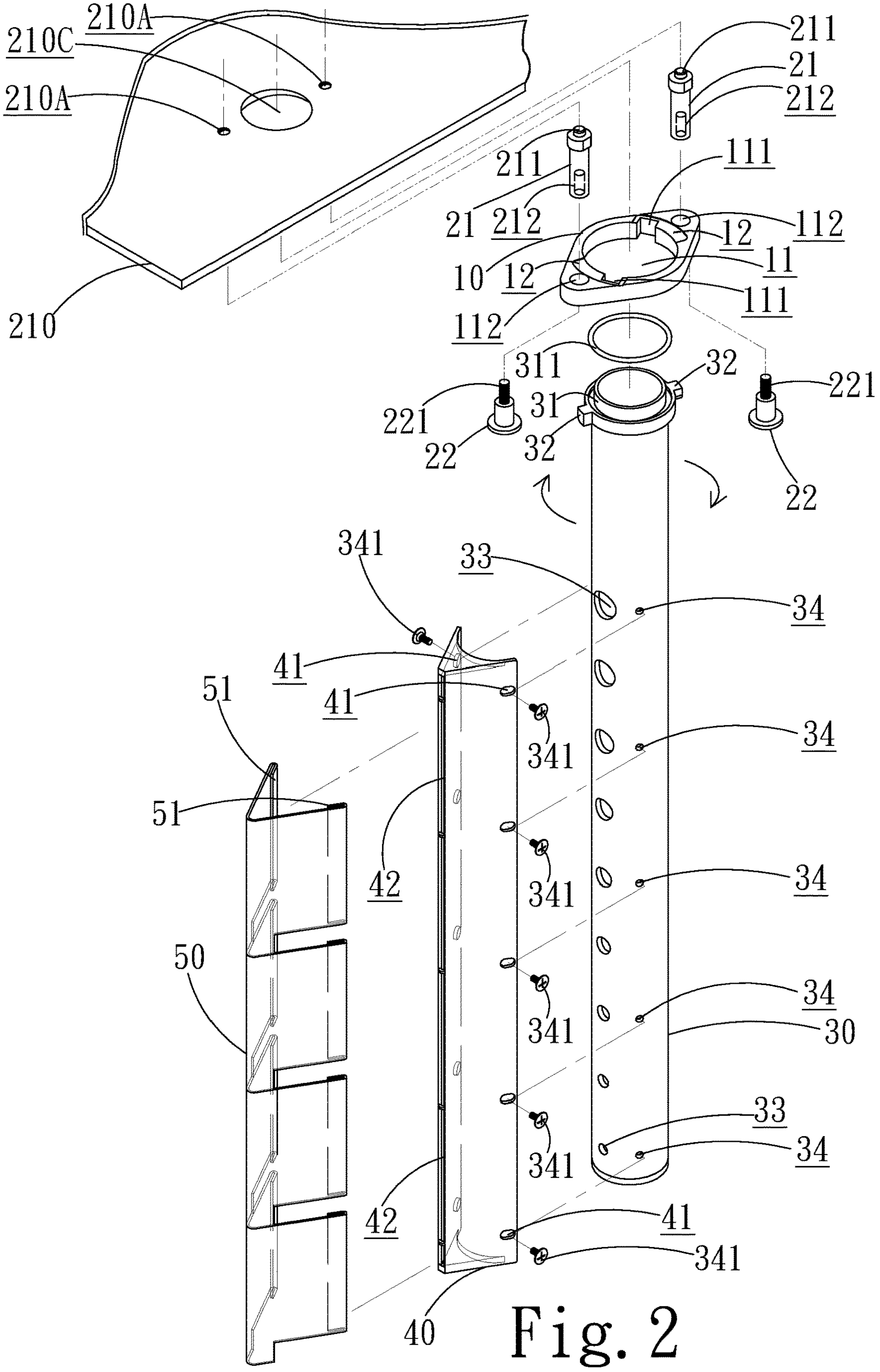
FIG. 2 is an exploded view showing the quick-release air knife of the package thermal-shrinking oven according to the present invention.
Figure 7:
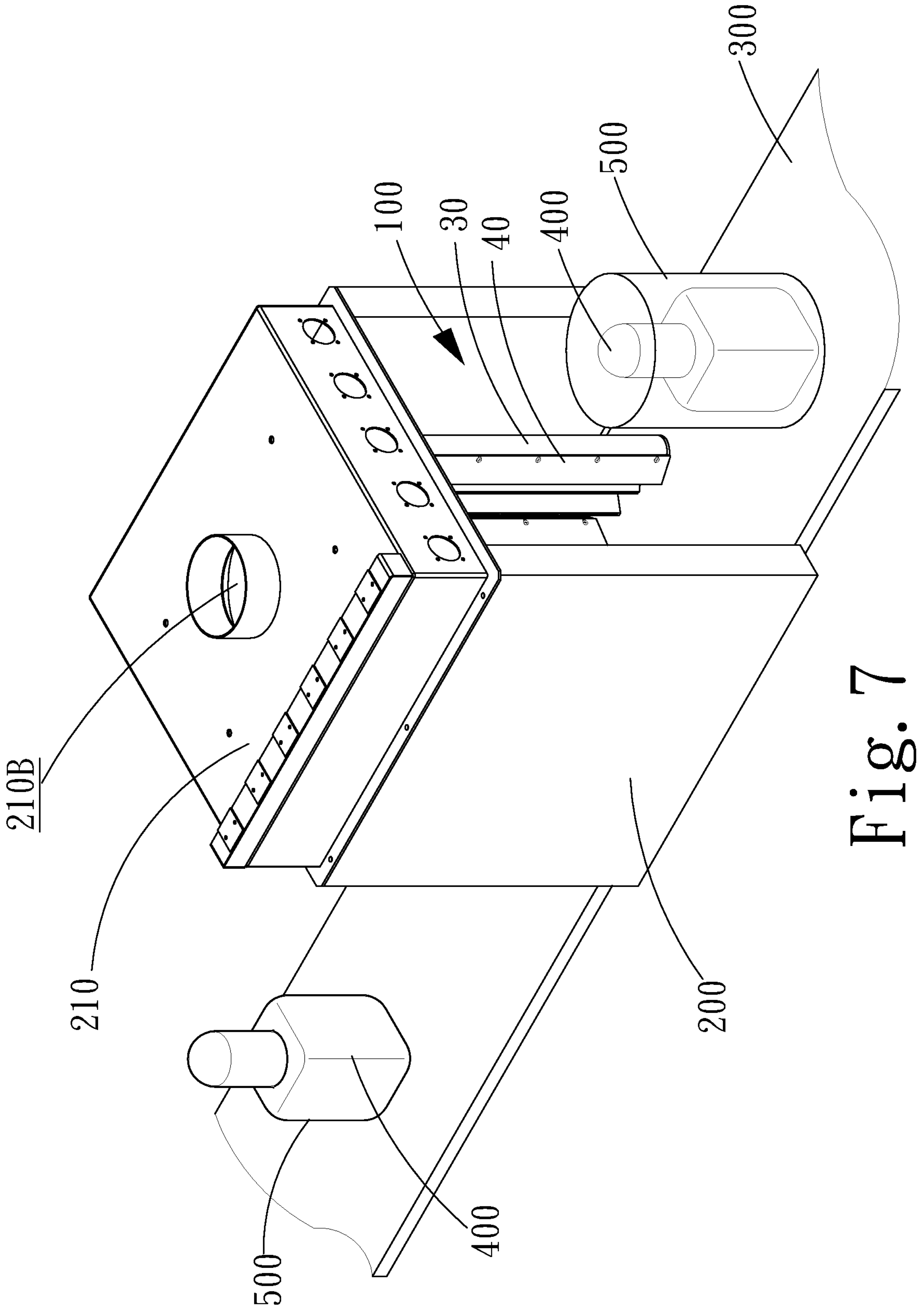
FIG. 7 is a schematic view illustrating a preferred application of the quick-release air knife of the package thermal-shrinking oven according to the present invention.

At least one pair of fixing elements 20 are provided, and each of the fixing elements 20 comprises at least an upper fixing member 21 and a lower fixing member 22, wherein top portions of the upper fixing members 21 are each provided with a threaded rod 211 for fastening to one pair of a plurality of threaded holes 210A in a bottom portion of a hot airflow combination box 210 on a top portion of a package thermal-shrinking oven 200 (as shown in FIG. 7). The upper fixing members 21 are each formed, in an interior of a lower end, with at least one threaded hole 212. The lower ends of the upper fixing members 21 extend through the fixing holes 112 of the fixing ring 10. The lower fixing members 22 are each formed, in a top surface, with a threaded rod 221 to extend into a respective one of the fixing holes 112 of the fixing ring 10 for fastening to the threaded hole 212 of the lower end of a corresponding one of the upper fixing elements 21. Each of the lower fixing members 22 has a lower-end diameter that is greater than a diameter of the fixing holes 112 of the fixing ring 10, so as to allow the threaded rod 221 of the top surface of the lower fixing member 22 to correspondingly fasten to and fix to the threaded hole 212 of the lower end of the upper fixing member 21 such that the lower end of the lower fixing member 22 engages with and is retained under the fixing hole 112 of the fixing ring 10 to fix the fixing ring 10 between the upper fixing member 21 and the lower fixing member 22. Further, the hot airflow combination box 210 on the top portion of the package thermal-shrinking oven 200 is formed, in a top end, with at least one hot airflow ingress opening 210B to receive a hot airflow 220 to introduce therein (in a direction shown by arrows in FIG. 3). The bottom portion of the hot airflow combination box 210 is formed with a plurality of airflow exit openings 210C. Each of the airflow exit openings 210C is arranged between the threaded holes 210A in the bottom portion of the hot airflow combination box 210 (as shown in FIG. 2), and the airflow exit openings 210C each correspond to and match with each through hole 11 of the fixing ring 10.

Figure 3:
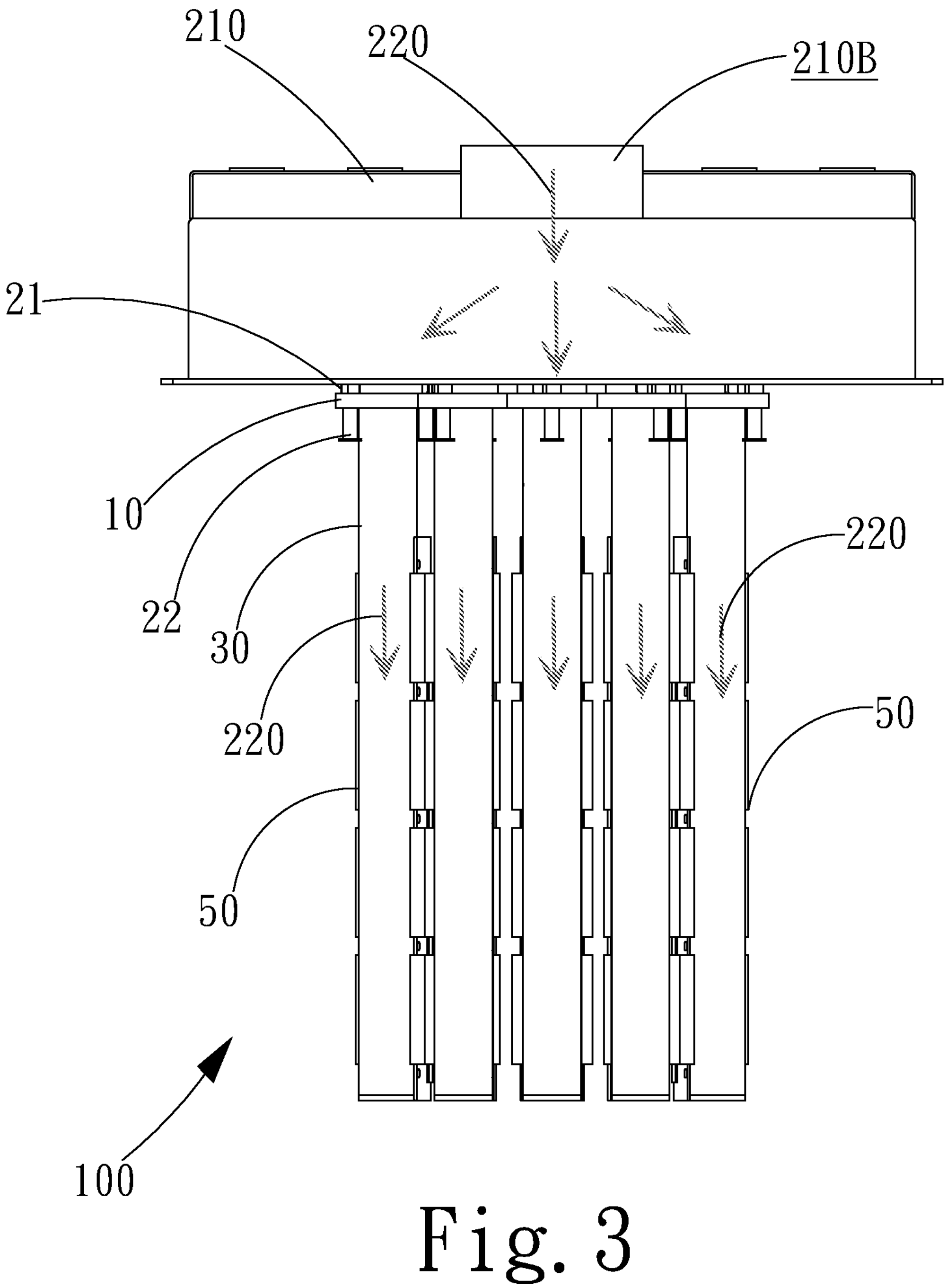
FIG. 3 is a rear view showing a package thermal-shrinking oven according to the present invention.

A plurality of air knife tubes 30 are provided, and a top portion of each of the air knife tubes 30 is provided with a connecting portion 31 and at least one pair of fitting blocks 32. At least one heat-resistant ring 311 is fit outside of the connecting portion 31. A surface of each of the air knife tube 30 is formed with a plurality of hot airflow discharging openings 33 and a plurality of fastening threaded holes 34. The connecting portion 31 and the fitting blocks 32 of the air knife tube 30 respectively correspond to and match with the through hole 11 and the notches 111 of the fixing ring 10, and the top portion of the air knife tube 30 is insertable upward to pass the through hole 11 and the notches 111 for subsequent rotation by a certain angle (in a direction indicated by the arrow shown in FIG. 2). In an example of the present invention, the rotation is made clockwise for a given angle, so that the fitting blocks 32 are respectively fit into and positioned in the retention engagement troughs 12 in the top surface of the fixing ring 10, and the connecting portion 31 and the heat-resistant ring 311 of the air knife tube 30 are respectively connected to each airflow exit opening 210C in the bottom portion of the hot airflow combination box 210 arranged on the top portion of the package thermal-shrinking oven 200 to guide the hot airflow 220 into each air knife tubes 30 (as shown in FIG. 3) to have the hot airflow 220 to subsequently discharge out by passing through each of the hot airflow discharging openings 33 of the air knife tube 30.

Similarly, to remove and replace the air knife tube 30 that is connected to each airflow exit opening 210C in the bottom portion of the hot airflow combination box 210 arranged on the top portion of the package thermal-shrinking oven 200, the air knife tube 30 is rotated reversely (namely in a counterclockwise direction) by a given angle to have the fitting blocks 32 of the air knife tube 30 rotated counterclockwise to disengage from the retention engagement troughs 12 and reach positions corresponding to the notches 111 of the fixing ring 10, and then, the air knife tube 30 is pulled downward to have the connecting portion 31 on the top portion of the air knife tube 30 moved downward and separated from the airflow exit opening 210C and the through hole 11 of the fixing ring 10, and the fitting blocks 32 on the top portion of the air knife tube 30 are also moved downward to pass through the notches 111 of the fixing ring 10 to separate from the fixing ring 10, so as to complete an operation of quick release of the air knife tube 30.

Figure 4:
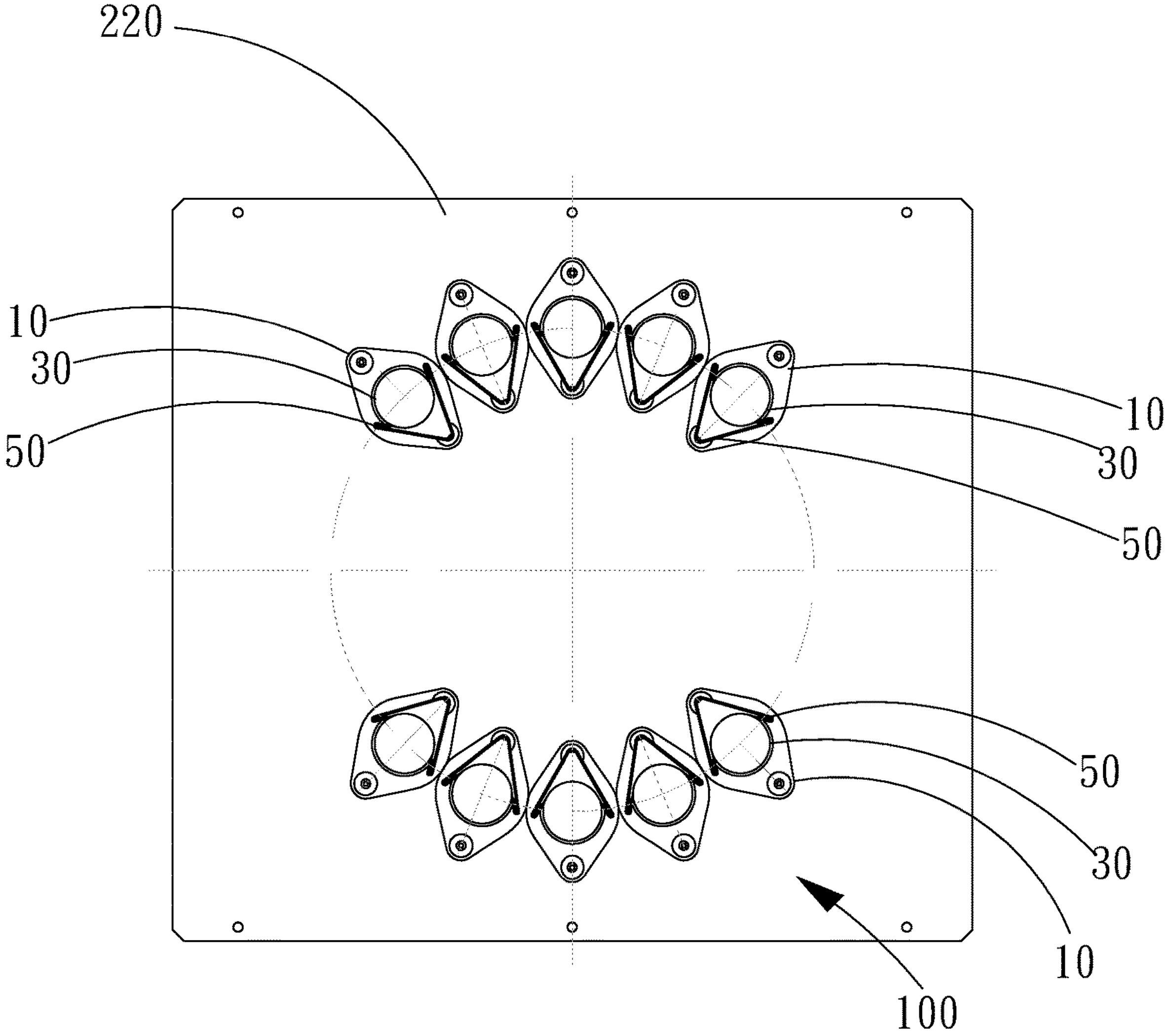
FIG. 4 is a top plan view, which shows an arrangement structure for each air knife tube connected inside the package thermal-shrinking oven according to the present invention.

Each of the air knife tubes 30 is arranged to connect to a corresponding airflow exit opening 210C in the bottom portion of the hot airflow combination box 210 arranged on the top portion the package thermal-shrinking oven 200, and may be arranged in a desired shape, which is not limited to any specific shape, in the interior of the package thermal-shrinking oven 200. In the present invention, an arrangement of two rows in the interior of the package thermal-shrinking oven 200 to each correspond to one of two semicircular shapes respectively correspond to two 180-degree segments (as shown in FIG. 4) is taken as an example for illustration, while other equivalent arrangement directions and shapes are also considered within the scope of the present invention.

A plurality of air knife blades 40 are provided, and each of the air knife blades 40 is formed with a plurality of fastening elongated holes 41 and airflow-discharging elongated holes 42. The fastening elongated holes 41 respectively correspond to the fastening threaded holes 34 of the air knife tubes 30 and each receives a fastening bolt 341 to penetrate therethrough for fastening so as to have the air knife blade 40 combined with and fixed to outside of the air knife tube 30. The airflow-discharging elongated holes 42 of the air knife blade 40 correspond to the hot airflow discharging openings 33 of the air knife tube 30 to allow the hot airflow 220 discharged through each of the hot airflow discharging openings 33 of the air knife tube 30 to blow out through the airflow-discharging elongated holes 42. Each of the airflow-discharging elongated holes 42 of the air knife blade 40 guides the hot airflow 220 from the air knife tube 30 to discharge in a discharging path that is a linear path and direction (as indicated by arrows shown in FIG. 8).

Figure 5:
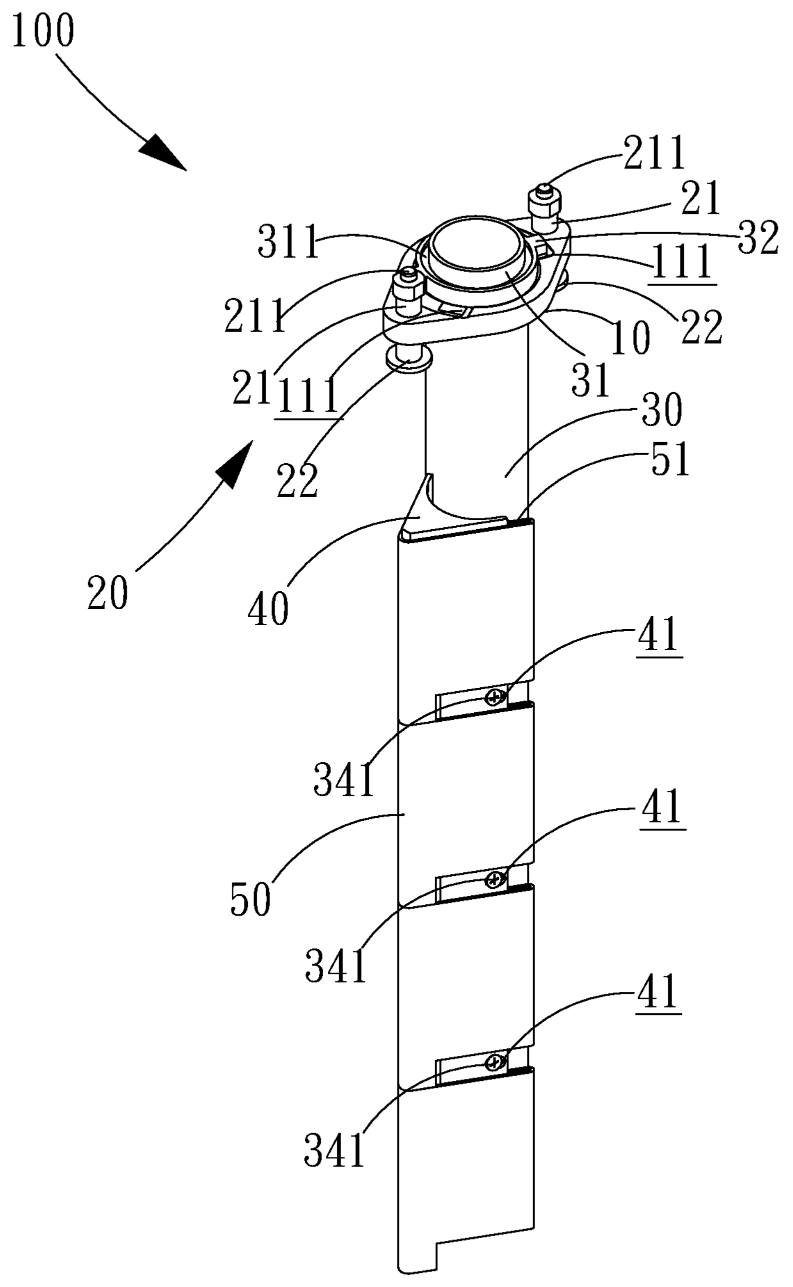
FIG. 5 is a perspective view showing a connection structure of the air knife tube with respect to a fixing ring, an air knife blade, and an elastic airflow blocking board according to the present invention.
Figure 6:
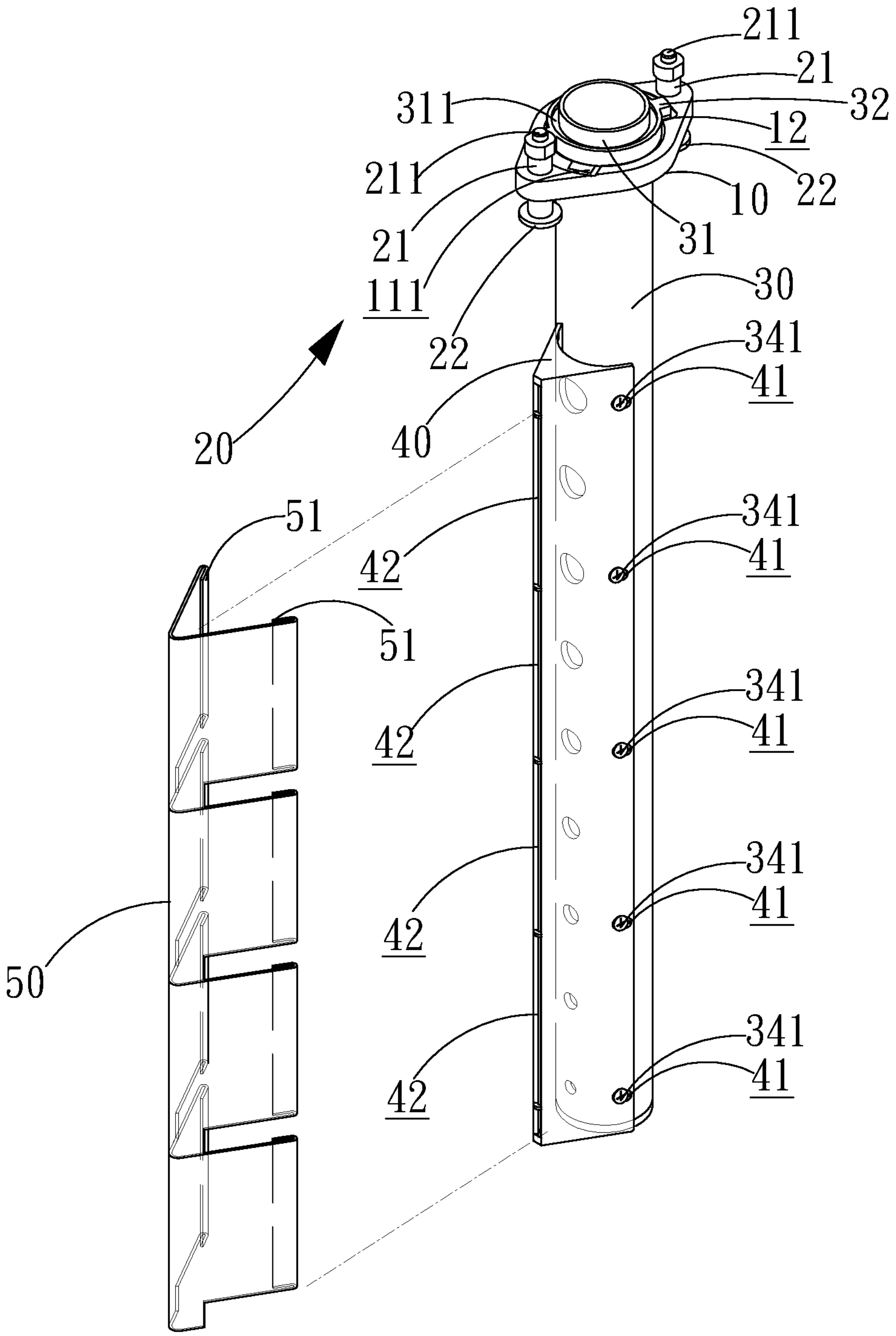
FIG. 6 is an exploded view of a portion of FIG. 5, in which a connection structure between the elastic airflow blocking board and the air knife blade according to the present invention is shown.

At least one elastic airflow blocking board 50 is provided, and each elastic airflow blocking board 50 has at least one elastic engagement portion 51 provided on each of two sides. The elastic engagement portion 51, by means of compressibility and restoration spring force thereof, is set in retaining engagement with two sides of exterior of the air knife blade 40 to have the elastic airflow blocking board 50 combined with and fixed to outside of the air knife blade 40 (as shown in FIGS. 5 and 6) to block the hot airflow 220 from discharging from each of the airflow-discharging elongated holes 42 of the air knife blade 40.

Shapes of the air knife blades 40 and the elastic airflow blocking board 50 are not limited to any specific ones, and in the present invention, the air knife blades 40 and the elastic airflow blocking board 50 having a cross section of a V-shape is taken as an example for illustration.

Figure 8:
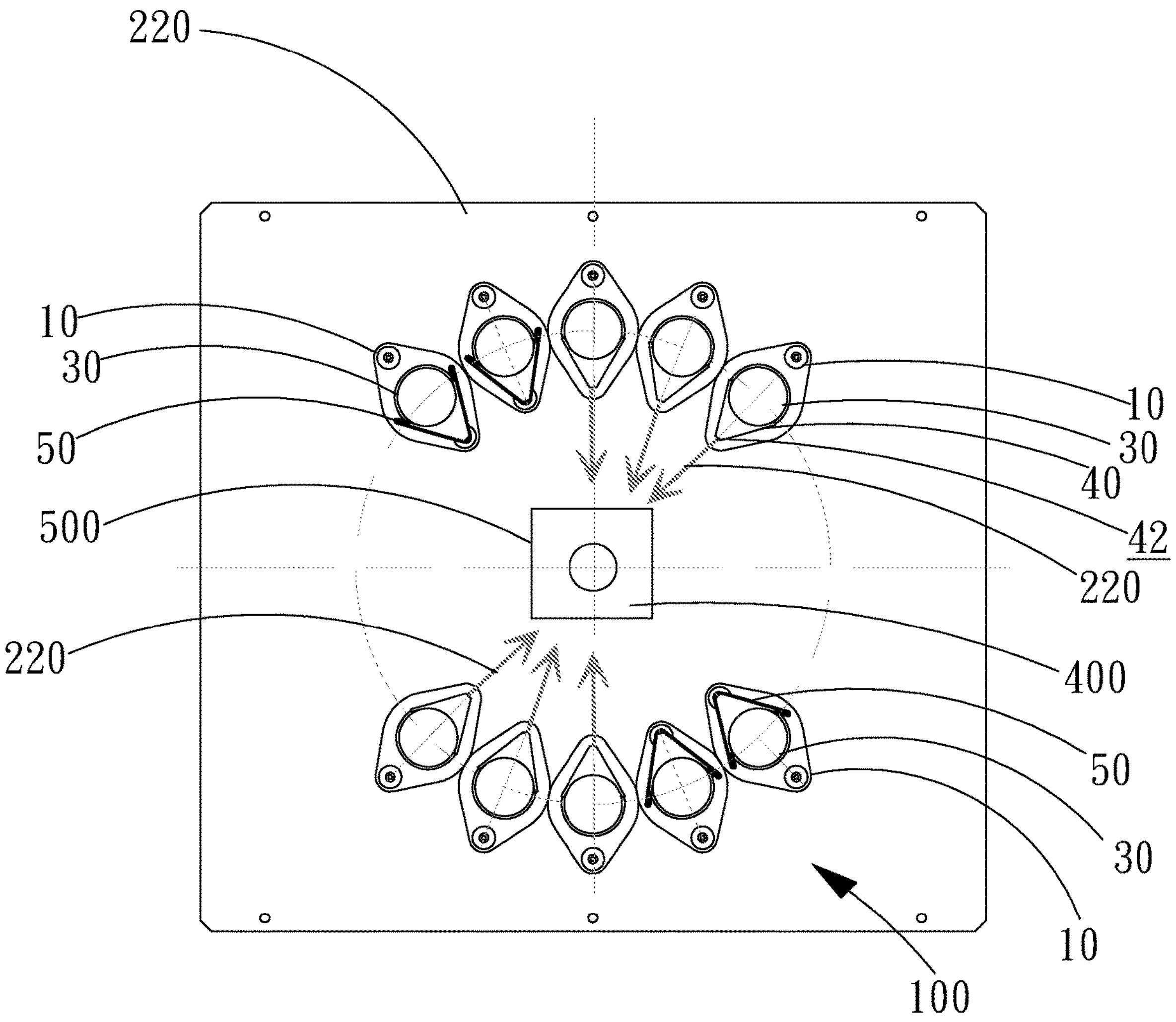
FIG. 8 is a top plan view, in which a state of a discharged hot airflow of each air knife tube being applied to implement a heat-shrinking packaging operation on an object-to-be-packaged in the package thermal-shrinking oven shown in FIG. 7 is shown.

Referring to FIGS. 7 and 8, a preferred application of the quick-release air knife 100 of the package thermal-shrinking oven according to the present invention is shown, wherein a conveyance belt 300 extending across the package thermal-shrinking oven 200 carries, on one end thereof, at least one packaged object 400. A heat-shrinkable package film 500 is sleeved outside of the packaged object 400. Each of the air knife tubes 30, which are set in the arrangement of two rows in the interior of the package thermal-shrinking oven 200 to each correspond to one of two semicircular shapes respectively correspond to two 180-degree segments, is adjustable to correspond to a shape and a size of the packaged object 400 and the heat-shrinking packaging property of the heat-shrinkable package film 500 to adjust discharging or not, and discharging direction and path of the hot airflow 220 from each of the air knife tubes 30. In the example of preferred application illustrated here for the present invention, the air knife blades 40 of the first three ones of the air knife tubes 30 of one of the rows arranged at one side in the interior of the package thermal-shrinking oven 200 are all not combined with the clastic airflow blocking board 50, and the hot airflow 220 is blown out of the airflow-discharging elongated holes 42 of the air knife blades 40, while the air knife blades 40 of the last two of the air knife tubes 30 of the row are each combined with the elastic airflow blocking board 50 to block the discharging of the hot airflow 220; and the air knife blades 40 of the first two of the air knife tubes 30 of one of the two rows arranged at an opposite side in the interior of the package thermal-shrinking oven 200 are each combined with the elastic airflow blocking board 50 to block the discharging of the hot airflow 220, while the air knife blades 40 of the last three of the air knife tubes 30 of the row are not combined with the elastic airflow blocking board 50, and the hot airflow 220 is blown out of the airflow-discharging elongated holes 42 of the air knife blades 40. In other words, when the packaged object 400 and the heat-shrinkable film 500 are conveyed by means of the conveyance belt 300 into the interior of the package thermal-shrinking oven 200, the hot airflow 220 discharged in a linear path from the airflow-discharging elongated holes 42 of the air knife blades 40 of the first three ones of the air knife tubes 30 arranged at one side in the interior of the package thermal-shrinking oven 200 and the hot airflow 220 discharged in a linear path from the airflow-discharging elongated holes 42 of the air knife blades 40 of the last three ones of the air knife tubes 30 arranged at an opposite side in the interior of the package thermal-shrinking oven 200 jointly carry out a heat-shrinking packaging operation on the heat-shrinkable package film 500 on the outside of the packaged object 400 to have the heat-shrinkable package film 500 uniformly and thermally shrunk over and packaging the outside of the packaged object 400. For packaged objects 400 and heat-shrinkable package films 500 of different shapes and sizes, the air knife tubes 30, which are set in the arrangement of two rows in the interior of the package thermal-shrinking oven 200 to each correspond to one of two semicircular shapes respectively correspond to two 180-degree segments, are settable and adjustable for each charging the hot airflow 220 or not discharging the hot airflow 220 to thereby enhance the quality of the heat-shrinkable package film 500 thermally shrunk and packaging on the outside of the packaged object 400.

In the example of preferred application of the quick-release air knife 100 of the package thermal-shrinking oven according to the present invention shown in FIGS. 7 and 8, for the air knife tubes 30 that are set in the arrangement of two rows in the interior of the package thermal-shrinking oven 200 to each correspond to one of two semicircular shapes respectively correspond to two 180-degree segments, the number and arrangement shape of the air knife tubes 30 are not limited thereto and may be adjusted in respect of number, arrangement shape, control of the hot airflow 220 of each of the air knife tubes 30 at different positions to discharge or not, according to the shape and size of the packaged object 400 and the heat-shrinking packaging property of the heat-shrinkable package film 500.

The quick-release air knife 100 of the package thermal-shrinking oven according to the present invention is shown in FIGS. 1-8, wherein the description and drawings are provided for easy explanation of the technical contents and technical measures of the present invention, and the preferred embodiments so described provide only a fraction of the present invention and are not intended for constraining the scope thereof, and further any equivalent substitute and modification of structure and component of the details of the present invention are considered failing within the scope of the present invention as defined solely by the appended claims.

What is claimed is:

1. A quick-release air knife of a package thermal-shrinking oven, comprising:

at least one fixing ring, the fixing ring being formed, in an interior thereof, with at least through hole, a periphery of the through hole being formed with at least one pair of notches and fixing holes, the notches being in communication with the through hole;

at least one pair of fixing elements, which have upper ends combined with and fixed to a bottom portion of a hot airflow combination box arranged on a top portion of a package thermal-shrinking oven and lower ends correspondingly extending into the fixing holes of the fixing ring and connected to and fixed to the fixing holes;

a plurality of air knife tubes, each of the air knife tubes having a top portion that is formed with a connecting portion and at least one pair of fitting blocks, wherein the connecting portion and the fitting blocks of the air knife tube respectively correspond to and match with the through hole and the notches of the fixing ring, and the top portion of the air knife tubes is upward movable to pass through the through hole and the notches and then rotated by an angle to have the fitting blocks fit to a top surface of the fixing ring and to have the connecting portion of the air knife tube connected to the bottom portion of the hot airflow combination box for introducing a hot airflow into the air knife tube; and a plurality of air knife blades, each of the air knife blades being combined to outside of the air knife tube, the air knife blade guiding a discharging direction and path of the hot airflow discharged from the air knife tube.

2. The quick-release air knife of the package thermal-shrinking oven according to claim 1, wherein the top surface of the fixing ring is formed with at least one pair of retention engagement troughs, and the retention engagement troughs are respectively in communication with top ends of the notches of the fixing ring for retention engagement and positioning for the fitting blocks of the air knife tube.

3. The quick-release air knife of the package thermal-shrinking oven according to claim 1, wherein each of the fixing elements comprises at least one upper fixing member and one lower fixing member, wherein the upper fixing member has a top portion that is provided with a threaded rod for fastening to the bottom portion of the hot airflow combination box arranged on the top portion of the package thermal-shrinking oven, and the upper fixing member is formed, in an interior of a lower end, with at least one threaded hole, the lower end of the upper fixing member extending through the fixing holes of the fixing ring, and the lower fixing member has a top surface that is provided with a threaded rod to correspondingly fasten to the threaded hole in the lower end of the upper fixing member to fix the fixing ring between the upper fixing member and the lower fixing member.

4. The quick-release air knife of the package thermal-shrinking oven according to claim 1, wherein the bottom portion of the hot airflow combination box arranged on the top portion of the package thermal-shrinking oven to which the top portion of the upper fixing member of each of the fixing elements is fastened is formed with a plurality of fastening threaded holes to each receive the threaded rod of the top portion of the upper fixing member of each of the fixing elements to fasten thereto.

5. The quick-release air knife of the package thermal-shrinking oven according to claim 1, wherein the lower fixing member of each of the fixing elements has a lower-end diameter that is greater than a diameter of the fixing holes of the fixing ring to have the threaded rod of the top surface of the lower fixing member fastened to the threaded hole of the lower end of the upper fixing member, such that the lower end of the lower fixing member engages with and is retained under the fixing hole of the fixing ring.

6. The quick-release air knife of the package thermal-shrinking oven according to claim 1, wherein at least one heat-resistant ring is fit outside the connecting portion on the top portion of the air knife tube to correspondingly connect to the bottom portion of the hot airflow combination box.

7. The quick-release air knife of the package thermal-shrinking oven according to claim 1, wherein the bottom portion of the hot airflow combination box to which the connecting portion on the top portion of the air knife tube is connected is formed with a plurality of airflow exit openings, the airflow exit openings respectively corresponding to the through holes of each of the fixing ring to respectively correspond to and connect with the connecting portion on the top portion of each of the air knife tubes.

8. The quick-release air knife of the package thermal-shrinking oven according to claim 1, wherein the air knife tubes are connected to the bottom portion of the hot airflow combination box arranged on the top portion of the package thermal-shrinking oven and are arranged in two rows in the interior of the package thermal-shrinking oven having arrangement shapes respectively corresponding to two 180-degree segments at two sides in the interior of the package thermal-shrinking oven.

9. The quick-release air knife of the package thermal-shrinking oven according to claim 1, wherein each of the air knife tubes is formed with a plurality of fastening threaded holes, and each of the air knife blades is formed with a plurality of fastening elongated holes to respectively correspond to the fastening threaded holes of the air knife tube and to each fasten by means a fastening bolt to have the air knife blade combined with and fixed to outside of the air knife tube.

10. The quick-release air knife of the package thermal-shrinking oven according to claim 1, wherein the air knife tubes are each formed with a plurality of hot airflow discharging openings to each discharge a hot airflow, and the air knife blades are each formed with a plurality of airflow-discharging elongated holes to blow out and guide blowing direction and path of the hot airflow discharged from each of the hot airflow discharging openings of the air knife tube.

11. The quick-release air knife of the package thermal-shrinking oven according to claim 1, wherein each of the air knife blades is combined, at an exterior thereof, with at least one elastic airflow blocking board to block the hot airflow from discharging from the air knife blades.

12. The quick-release air knife of the package thermal-shrinking oven according to claim 11, wherein the elastic airflow blocking board is provided with at least one elastic engagement portion on each of two sides to be set in retaining engagement with two sides of the exterior of the air knife blade by means of compressibility and restoration spring force of the elastic engagement portion, so that the elastic airflow blocking board is combined with and fixed to the exterior of the air knife blade.

13. The quick-release air knife of the package thermal-shrinking oven according to claim 12, wherein the air knife blades and the elastic airflow blocking board have a cross-section having a V-shape.

* * * * *